US010631070B2

(12) United States Patent
Kalish et al.

(10) Patent No.: US 10,631,070 B2
(45) Date of Patent: Apr. 21, 2020

(54) SYSTEM AND METHOD TO GENERATE A VIDEO ON-THE-FLY

(71) Applicant: IDOMOO LTD., Hod Hasharon (IL)

(72) Inventors: Danny Kalish, Raanana (IL); Assaf Fogel, Kfar-Saba (IL); Idan Shenberg, Aseret (IL)

(73) Assignee: IDOMOO LTD, Hod Hasharon (IL)

( * ) Notice: Subject to any disclaimer, the term of this patent is extended or adjusted under 35 U.S.C. 154(b) by 0 days.

(21) Appl. No.: 15/693,808

(22) Filed: Sep. 1, 2017

(65) Prior Publication Data

US 2018/0063602 A1 Mar. 1, 2018

Related U.S. Application Data

(63) Continuation-in-part of application No. 14/284,821, filed on May 22, 2014, now abandoned.

(51) Int. Cl.
*H04N 21/854* (2011.01)
*H04N 21/2668* (2011.01)
(Continued)

(52) U.S. Cl.
CPC ......... *H04N 21/854* (2013.01); *G11B 27/031* (2013.01); *H04L 65/4084* (2013.01); *H04L 65/605* (2013.01); *H04L 65/607* (2013.01); *H04L 65/80* (2013.01); *H04N 21/2343* (2013.01); *H04N 21/2393* (2013.01); *H04N 21/23439* (2013.01); *H04N 21/2668* (2013.01); *H04N 21/4402* (2013.01); *H04N 21/4532* (2013.01); *H04N 21/47202* (2013.01); *H04N 21/6581* (2013.01); *H04N 21/8456* (2013.01);
(Continued)

(58) Field of Classification Search
None
See application file for complete search history.

(56) References Cited

U.S. PATENT DOCUMENTS 8,555,281 B1 * 10/2013 van Dijk ............... G06F 9/4881
718/100
2008/0015877 A1 * 1/2008 McKenna ............. G06Q 30/00
705/1.1
(Continued)

FOREIGN PATENT DOCUMENTS

WO 200039997 A2 7/2000
WO 2007002448 A1 1/2007

OTHER PUBLICATIONS

Weisstein, Eric W., CRC Concise Encyclopedia of Mathematics, Second Edition, Chapman & Hall/CRC, 2003, p. 317.
(Continued)

*Primary Examiner* — Justin E Shepard
(74) *Attorney, Agent, or Firm* — Browdy and Neimark, P.L.L.C.

(57) ABSTRACT

A system and method for real-time generation and streaming of context based video includes receiving from a user at a remote site a request for a personal video, selecting and generating visual and audio materials according to pre-defined rules of a video generation template including determining an order of scenes, rendering a first portion of video frames, encoding the first portion of video frames, and streaming the first portion to the user, while generating a subsequent portion of video frames.

8 Claims, 8 Drawing Sheets

(51) Int. Cl.
    *H04N 21/239*     (2011.01)
    *H04N 21/2343*    (2011.01)
    *H04N 21/45*      (2011.01)
    *H04N 21/858*     (2011.01)
    *H04N 21/658*     (2011.01)
    *H04L 29/06*      (2006.01)
    *H04N 21/4402*    (2011.01)
    *H04N 21/845*     (2011.01)
    *H04N 21/8543*    (2011.01)
    *H04N 21/472*     (2011.01)
    *G11B 27/031*     (2006.01)
    *G11B 27/32*      (2006.01)

(52) U.S. Cl.
    CPC ..... *H04N 21/8543* (2013.01); *H04N 21/8586* (2013.01); *G11B 27/327* (2013.01)

(56) References Cited

U.S. PATENT DOCUMENTS

| | | | | |
|---|---|---|---|---|
| 2010/0115123 A1* | 5/2010 | Airamo | ............... | H04H 20/40 709/234 |
| 2012/0185772 A1 | 7/2012 | Kotelly et al. | | |
| 2012/0254456 A1 | 10/2012 | Visharam | | |
| 2013/0013688 A1 | 1/2013 | Wang et al. | | |
| 2013/0275557 A1* | 10/2013 | Myers | ............... | H04N 21/2221 709/219 |
| 2014/0068690 A1 | 3/2014 | Luthra et al. | | |

OTHER PUBLICATIONS http://mltc.rit.edu/sites/FLTC/Countries/French/Media/PDF/Combining%20Audio%20and%20Video%20in%20Movie%20Maker.pdf.

"PyGST_Tutorial Combining Audio and Video", http://wiki.pitivi.org/wiki/PyGST_Tutorial/Combining_Audio_and_Video, pp. 1-5, (last modified Jan. 22, 2011).

"AudioDub", http://avisynth.nl/index.php/AudioDub (last modified May 9, 2013).

"MP4Creator Home", http://mp4creator.sourceforge.net (Prereleased Jan. 9, 2009).

International Search Report dated Oct. 28, 2015 in corresponding PCT/IL15/50539.

Ozer, Jan, "What is HLS (Http Live Streaming)?", www.streamingmedia.com, pp. 1-6.

* cited by examiner

SYSTEM AND METHOD TO GENERATE A VIDEO ON-THE-FLY

TECHNICAL FIELD

The present invention relates generally to generation of context-based video files based on predefined templates. More particularly, the present invention relates to on-the-fly generation of context-based video files.

BACKGROUND

Techniques for video streaming of customized videos, which are prepared "on-the-fly" from customer data, generally require that a video file be created and subsequently streamed. When a customer is on-line and waiting for a video, this process may lead to long wait times.

SUMMARY

Embodiments of the present invention provide a system and method for real-time generation and streaming of context-based video according to a video template and context-related data pertaining to an individual user or customer. Generation and streaming of the context-based video include receiving from a user at a remote site a request for a personal video, including a template identifier; receiving context data of the user including a user profile and user transaction data; translating the context data into a canonical entity; selecting and generating visual and audio materials from the canonical entity, according to predefined rules of a video generation template determined by the template identifier, wherein generating the visual materials comprises determining an order of scenes according to the predefined rules and rendering a first portion of video frames from the canonical entity; encoding the first portion of video frames according to a predefined duration and a predefined frame rate per second; creating a streaming manifest file for the first portion and conveying a link to the streaming manifest file to the user; and streaming the first portion to the user, while generating a subsequent portion of video frames according to the predefined duration and the predefined frame rate per second. The rules may also determine an order of scenes of the visual and audio material. A link to the audio materials may also be included in the streaming manifest file, and a first portion of the audio materials may be streamed together with the first portion of video frames.

These, additional, and/or other aspects and/or advantages of the present invention are set forth in the detailed description which follows, and/or are inferable from the detailed description, and/or are learnable by practice of the present invention.

BRIEF DESCRIPTION OF DRAWINGS

The present invention will be more readily understood from the detailed description of embodiments thereof made in conjunction with the accompanying drawings of which.

DETAILED DESCRIPTION OF THE INVENTION

Figure 1:
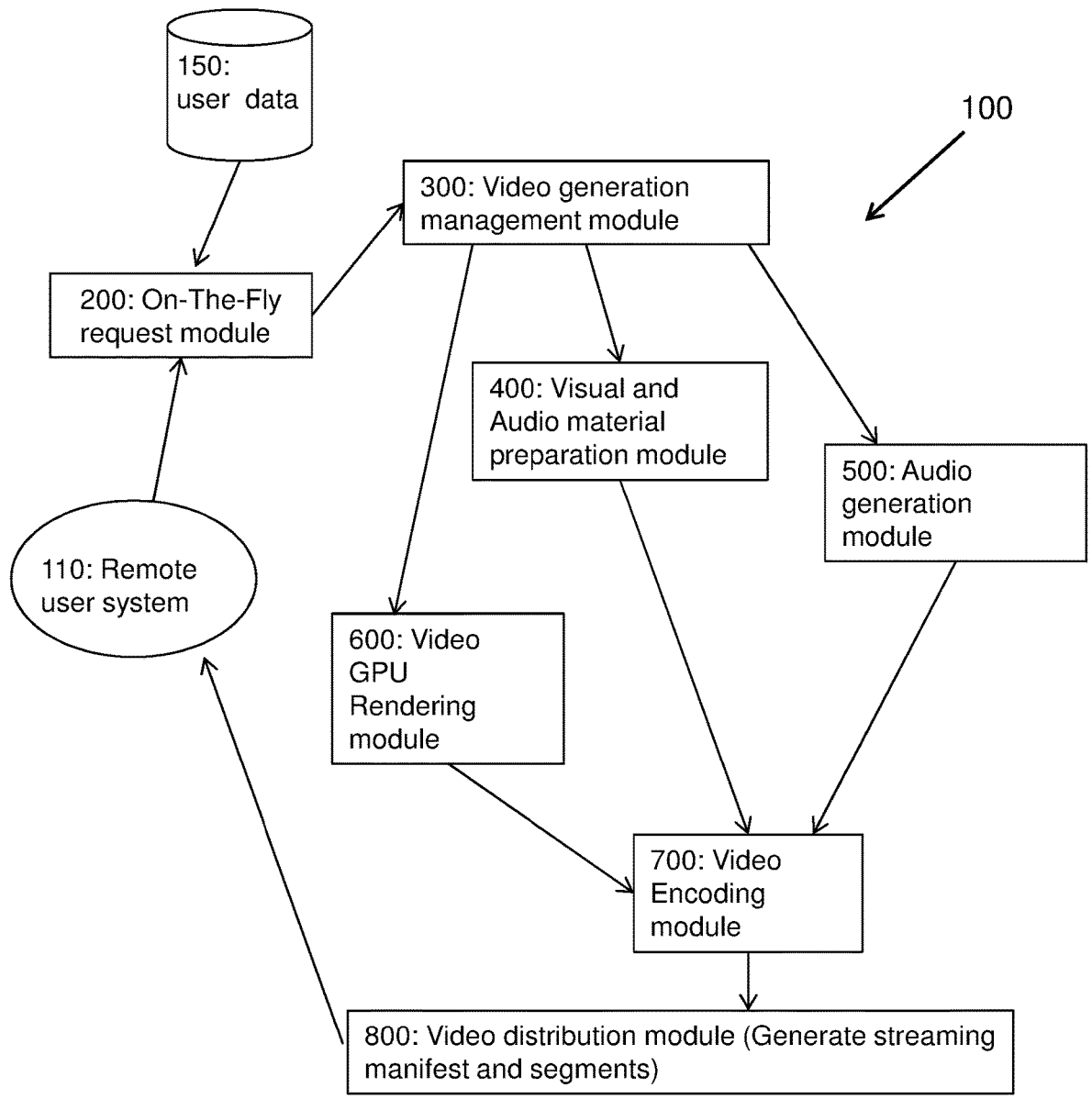
FIG. 1 is a block diagram of a real-time video generation process, according to an embodiment of the invention.

It is to be understood that the invention is not limited in its application to the details of construction and the arrangement of the components set forth in the following description or illustrated in the drawings. The invention is applicable to other embodiments or of being practiced or carried out in various ways. An embodiment is understood to be an example or implementation of the invention. The phrases "one embodiment", "an embodiment" or "some embodiments" do not necessarily all refer to the same embodiments. Also, the phraseology and terminology employed herein is for the purpose of description and should not be regarded as limiting.

FIG. 1 is a block diagram of a real-time video generation process implemented by a video generation and streaming platform, according to an embodiment of the invention.

The video generation and streaming platform is typically a back-end system that receives user requests conveyed from a user web interface or mobile application through a web or app server to the back-end system. User requests are requests for generating context-based videos such as customized or personal videos, according to predefined templates, the templates being defined to suit aspects of a given application and aspects of a user's profile.

The platform comprises an on-the-fly request module 200 for managing each user request. Each user request, after validation by the request module, is transmitted to a video generation management module 300. The video generation management launches a visual and audio material preparation module 400 which generates and determines the required visual and audio material for creating the requested video. Once the preparation process is done, the video generation management module launches an audio generation module 500, a video rendering GPU module 600, and a video encoding module 700.

The audio generation module creates a final audio stream for the full length of the requested video. Once the final audio stream is ready, the video encoding module begins encoding video segments from portions of the final audio stream and from the video frames received from the video GPU rendering module. The video encoding module sequentially generates portions of the full video stream, generating for each portion a streaming manifest and video segments.

Once a predefined number of segments are generated for a portion of the requested video, the video encoding module generates the streaming manifest with entries pointing to the generated segments. A video distribution module 800 identifies the creation of the manifest file and distributes it to the requesting user.

The above video generation flow enables a user to receive a customized video stream whereby a portion of the video is steamed while a second portion is still being encoded. Accordingly the user can start watching the video while the video generation is still in process.

Figure 2:
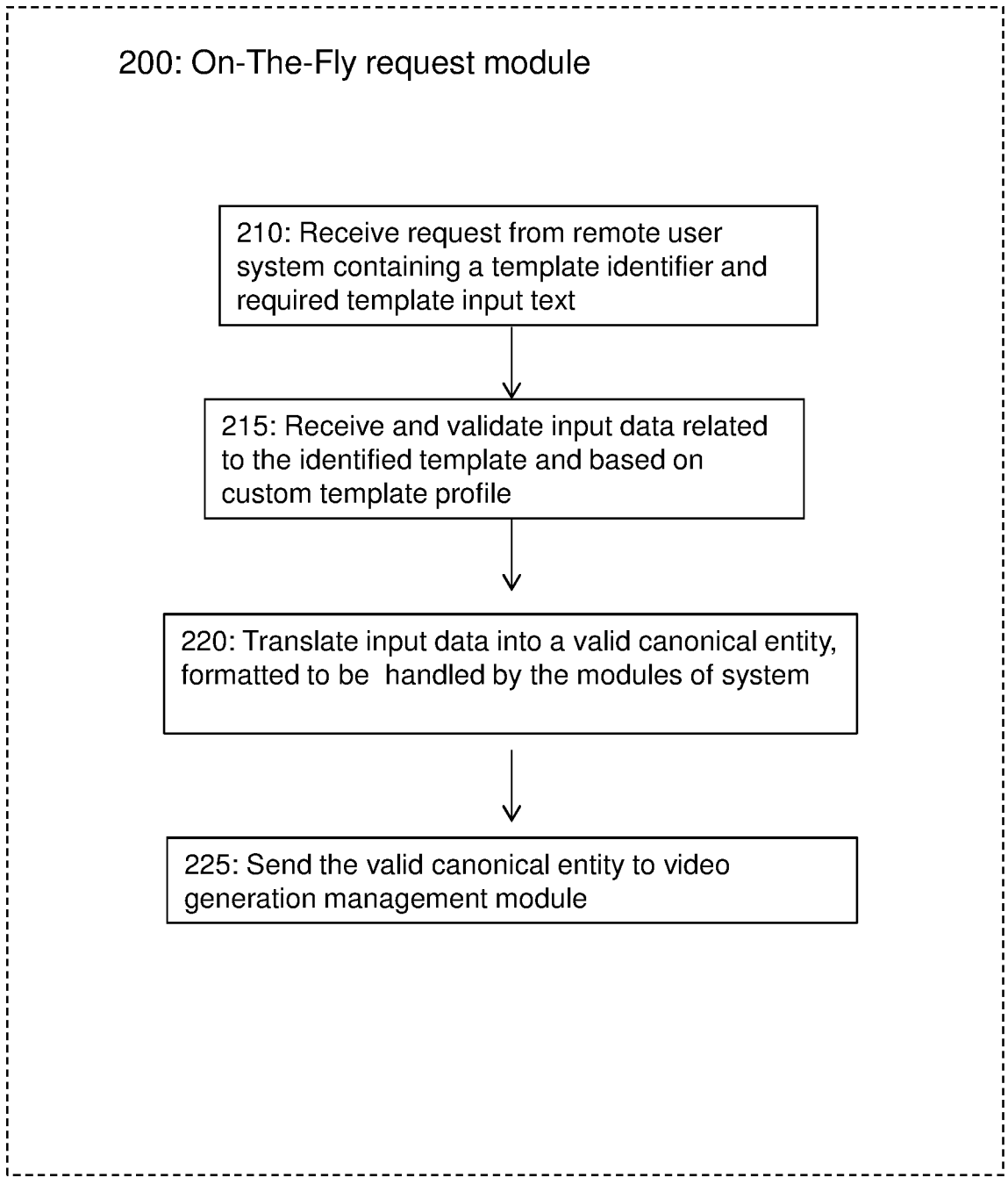
FIG. 2 is a flowchart diagram of an on-the-fly request module of the real-time video generation process, according to some embodiments of the invention.

FIG. 2 is a flowchart diagram of the on-the-fly request module 200, according to some embodiments of the invention. A remote user dispatches a video generation request for a context-based video (such as a personal video) that is received by the module at a step 210. Typically, the request includes technical parameters of the requested video, such as a requested frame rate and resolution. In addition, request includes a template identifier that indicates the context of the request. In some embodiments, the context is a type of customer/business relationship and the requested video is a video that will provide information related to transactions between the customer and the business. For example, an electric company customer may request a video with information about the customer's electricity consumption. A credit card customer may request a video that presents information about credit card transactions.

Upon retrieving the context template identifier, the module retrieves, at a step 215, context input data from a database, such as a user profile and additional data such as transaction data, which is also validated at this step. The context input data is then translated into a canonical entity appropriate for various modules of the video generation process at a step 220.

The canonical entity is then transferred to the video generation management module at a step 225. Subsequently, either the on-the-fly request module, or the video distribution module may begin streaming to the user the requested video.

Figure 3:
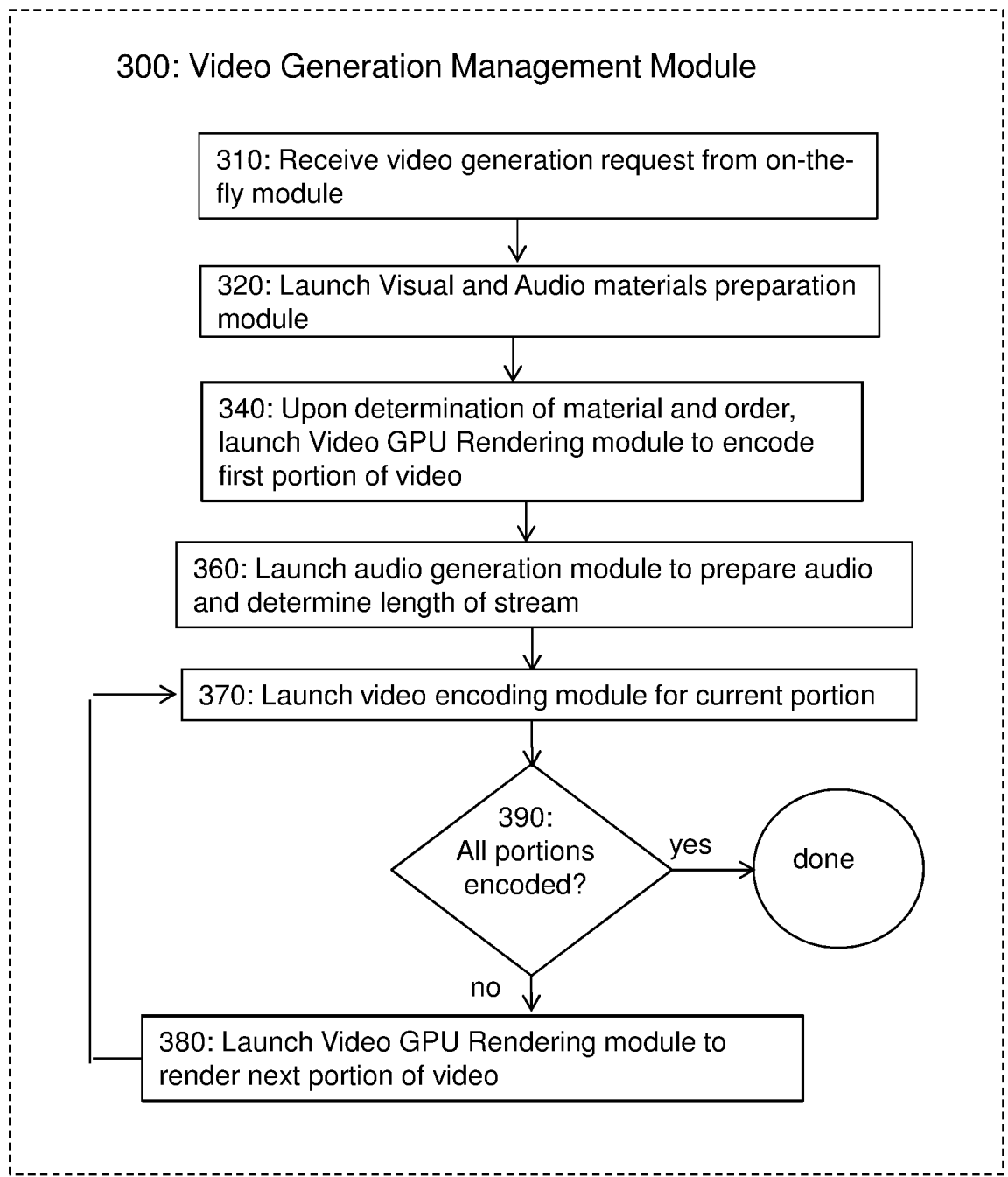
FIG. 3 is a flowchart diagram of a video generation management module of the real-time video generation process, according to some embodiments of the invention.

FIG. 3 is a flowchart diagram of the video generation management module 300, according to an embodiment of the present invention. The management module receives the video request and the conical entity of data prepared by the on-the-fly request module at a step 310. At a step 320, the management module launches the visual and audio material preparation module (module 400). Next, at a step 340, the management module receives the output of the visual and audio material preparation module and launches the video GPU rendering module (module 600).

Generally simultaneously, the management module launches at a step 360 the audio generation module (module 500), based on the prepared audio materials. Next, at a step 370, the management module launching the video encoding module (module 700).

At a step 390, the management module determines if all portions of the video have been generated and distributed to the user. If so, the process is done. If not, the video GPU rendering module is called again to render a next portion of video, at a step 380, and then the next portion is encoding at step 370, as the process continues in a loop until complete.

Figure 4:
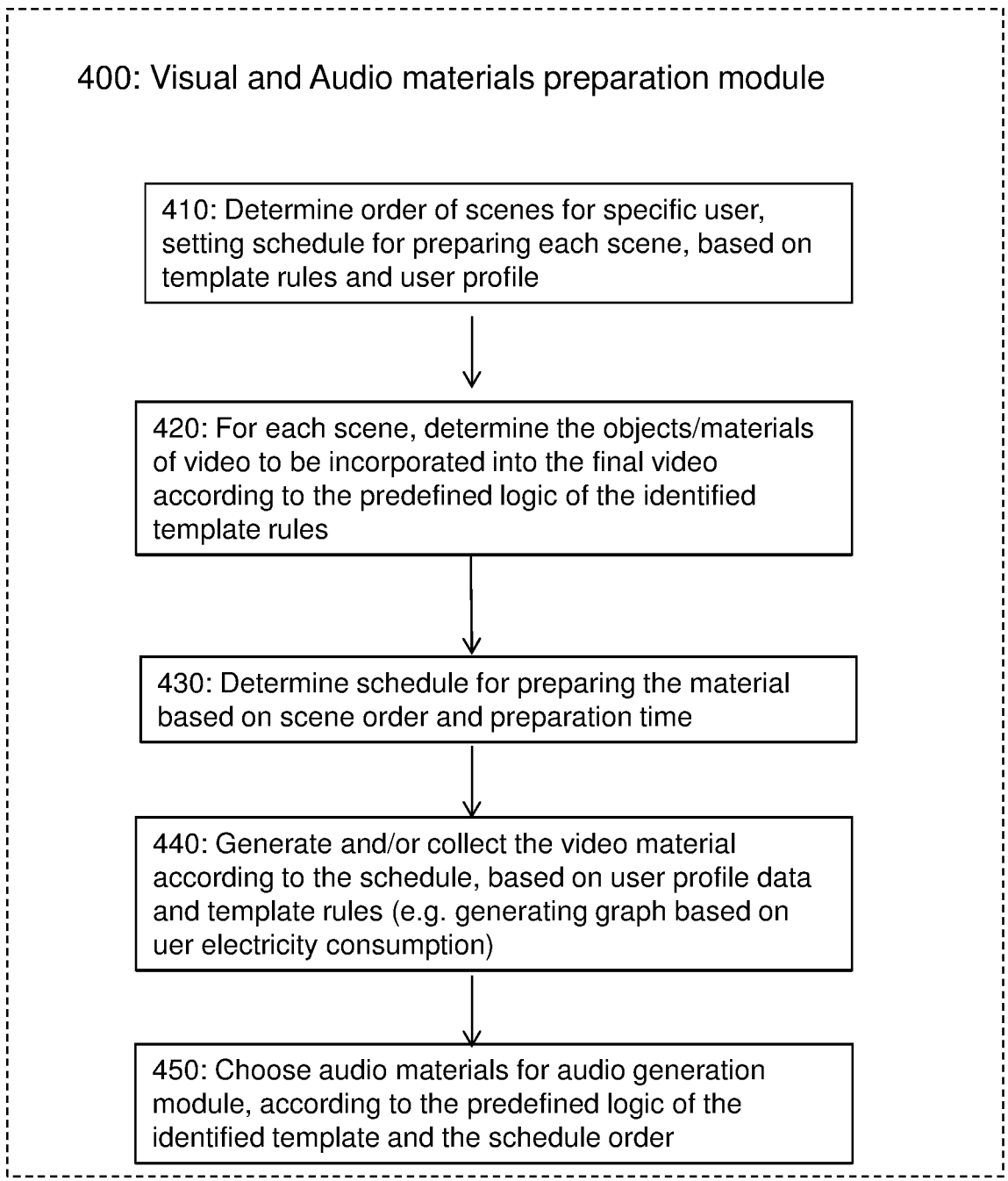
FIG. 4 is a flowchart diagram of a visual and audio materials preparation module of the real-time video generation process, according to some embodiments of the invention.

FIG. 4 is a flowchart diagram of a visual and audio materials preparation module 400 of the real-time video generation process 100, according to some embodiments of the invention.

At a step 410, the preparation module determines an order of scenes to be transmitted to the specific user according to rules of a video generation template file and the user profile, the template file being determined by the template identifier. For example, various scenes may be as follows in the case of a video request made by a customer of an electric company. The first scene may include a personal greeting including the user name. The second scene may include a graph displaying user energy consumption throughout the year, a graph generated from the user transaction data retrieved from a company database. A third scene may include graphic comparisons between previous years, also retrieved from user transaction data.

Based on template rules and the user profile the preparation module may determine various ways of ordering the scenes for a specific user, as different users (as differentiated by parameters of the user profile) may prefer different scene sequences, or different ways of ordering the scenes may be known to be more helpful for different types of users. For example, the rules may determine that a certain user instruction form or promotional advertisement should be presented before a given graph to some users, and after the graph to other users.

At a step 420, the preparation module selects the objects and materials that will be incorporated into each scene, again according to rules of the template rules file. For example, when the context of the video request is a request from an electric company consumer, the template may specify several scenes related to a user report of energy consumption. The first one may include a personal greeting with the user's name. The second one may include a graph displaying user energy consumption during the year, based on the user's transaction data. A third scene may include graphic comparisons to previous years based on personal data.

Each scene may be set as an individual portion of the requested video, which will be generated incrementally as multiple portions.

After determining scenes and objects and/or materials, the preparation module, at a step 430, determines a schedule for preparing the material according to the scene order and the estimated preparation time, which is generally determined from preset rules, as well. Materials may include personalized images and customized graphs including animated elements of the materials (such as an animation of the graph being generated). Materials that may require more preparation time, and therefore scheduled to be prepared first, with a higher priority, may include, for example material that requires computationally intensive signal processing, such as text to speech or speech to text conversions (especially as the text may subsequently require conversion to a video format).

Next, at a step 440 the preparation module generates and/or collect the video material according to the schedule, based on the user profile (such as age, address, display preferences, musical preferences) and template rules (e.g. generating graphs, based on electricity consumption, or bar chart based on transactions, according to transaction type).

At a step 450, the preparation module chooses audio materials for the audio generation module, also according to the predefined logic of the identified template and the schedule order.

Figure 5:
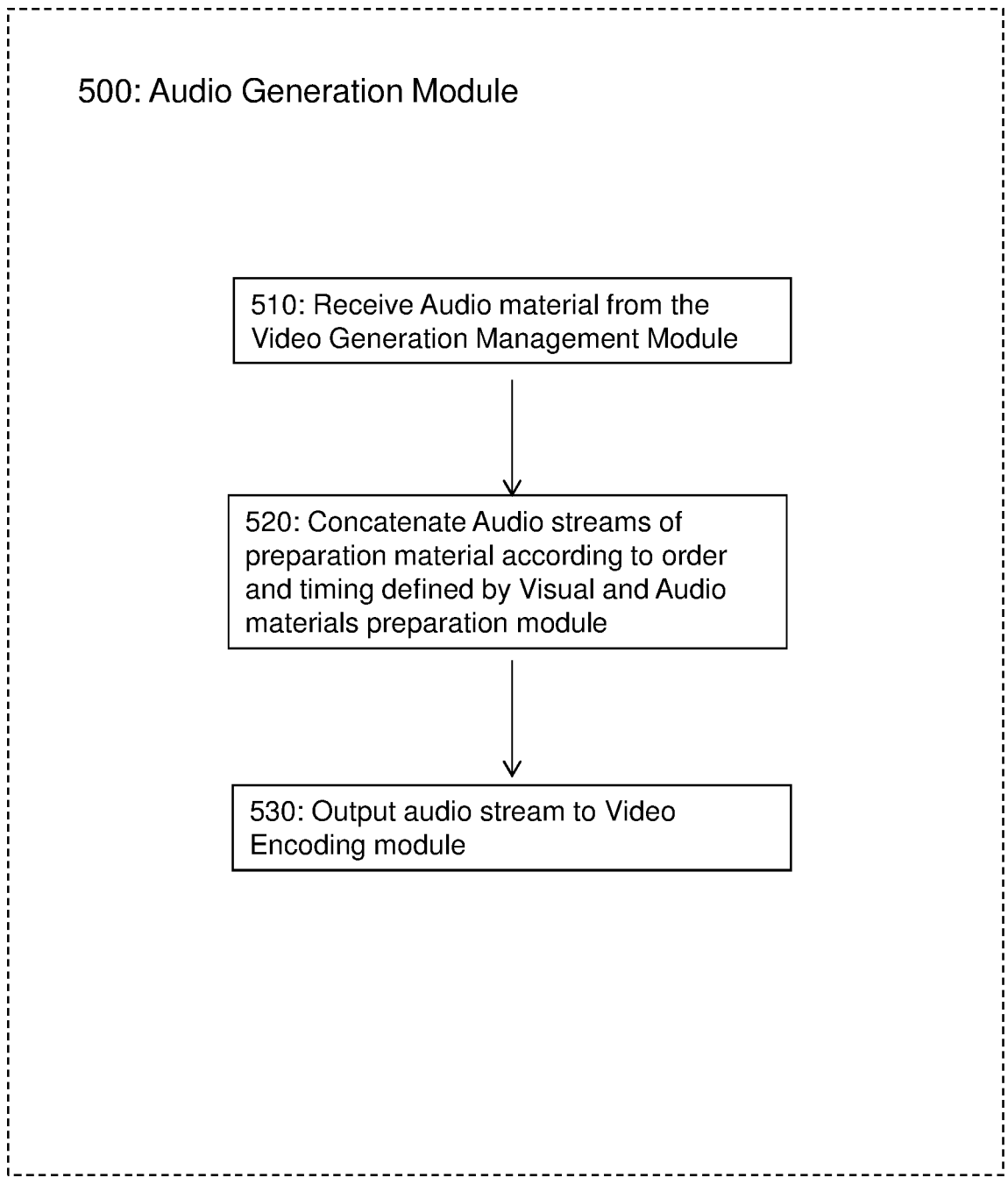
FIG. 5 is a flowchart diagram of an audio generation module of the real-time video generation process, according to some embodiments of the invention.

FIG. 5 is a flowchart diagram of an audio generation module 500 of the real-time video generation process, according to some embodiments of the invention.

The audio generation module is launched by the video generation management module, after the visual and audio materials preparation module has finished selecting the appropriate materials. The module receives audio materials from the video generation management module at a step 510 and then executes asynchronously with respect to the other modules of the system.

At a step 520, the audio generation module processes the audio materials by refining the audio streams and concatenating them in proper gaps and order according to rules set by the visual and audio materials preparation module (rules set in turn according to the template rules). The Audio streams are further processed and mixed together to create a single audio stream to be used as the final audio stream for the video, and output to the video encoding module (module 700) at a step 530.

Figure 6:
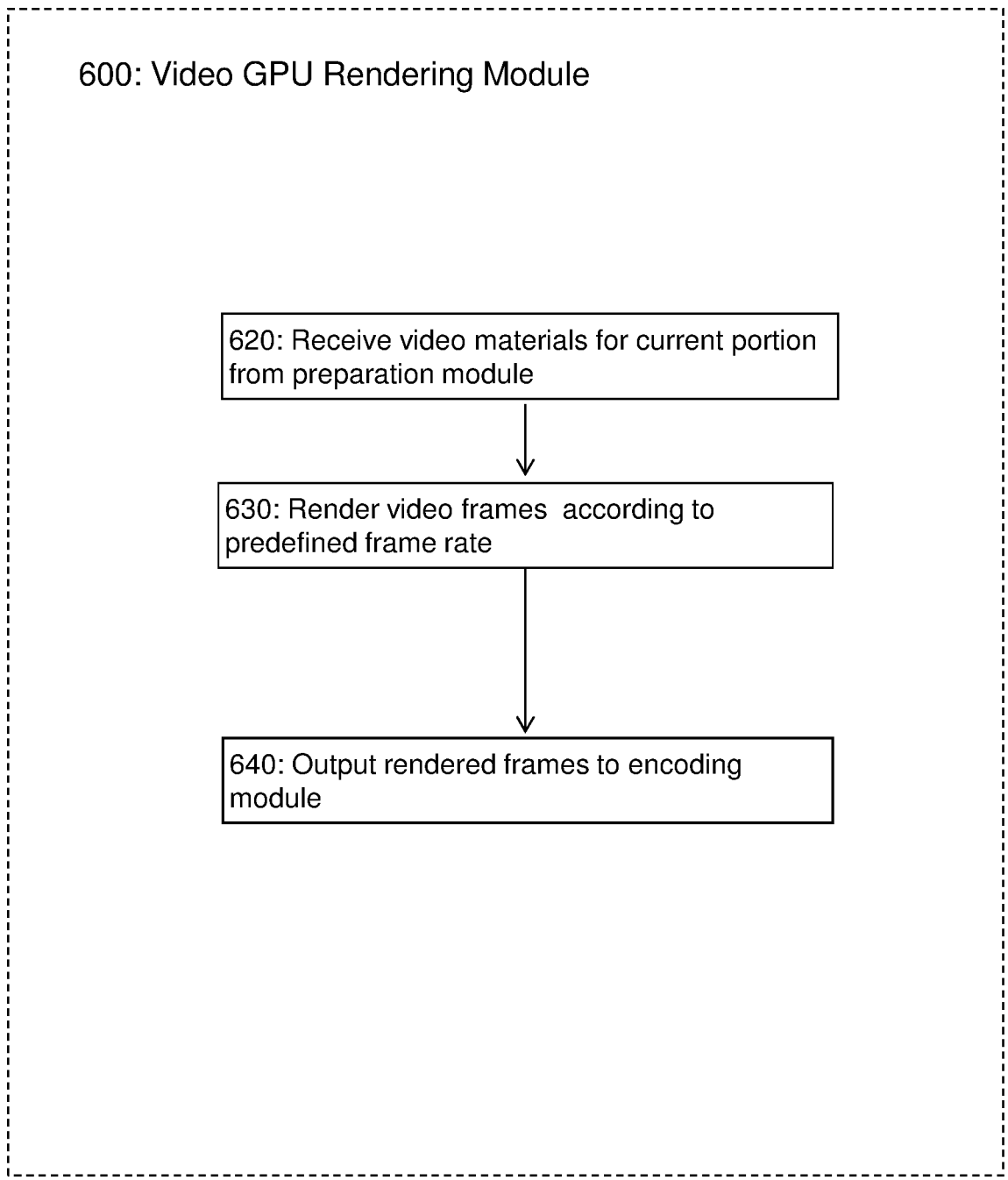
FIG. 6 is a flowchart diagram of a video graphics processing unit (GPU) rendering module of the real-time video generation process, according to some embodiments of the invention.

FIG. 6 is a flowchart diagram of the video graphics processing unit (GPU) rendering module 600 of the real-time video generation process, according to some embodiments of the invention.

The rendering module is launched by the video generation management module (module 300) and is responsible for rendering the visual material prepared by the preparation module (module 400). At a step 620, the rendering module receives the material for the current portion of the video to be generated, as determined by the preparation module. The video frames are then rendered at a step 630 and piped to the encoding module (module 700) at a step 640.

Figure 7:
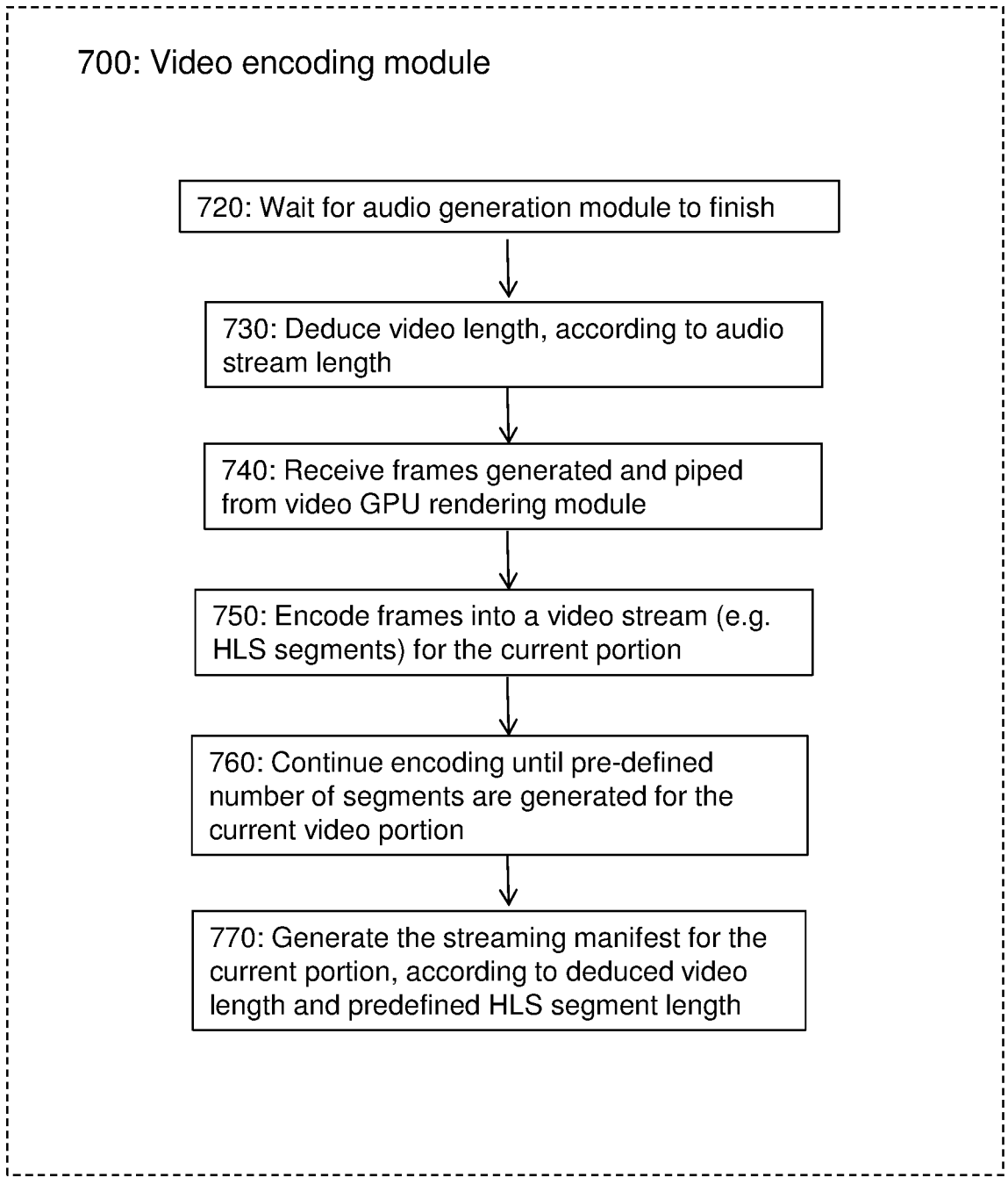
FIG. 7 is a flowchart diagram of a video encoding module of the real-time video generation process, according to some embodiments of the invention.

FIG. 7 is a flowchart diagram of a video encoding module 700 of the real-time video generation process, according to some embodiments of the invention.

The encoding module is launched by the video generation management module (module 300). The encoding module, at an initial step 720, waits to begin processing until the final audio stream is ready. Based on the final audio stream length, the complete movie duration is determined at a step 730.

The encoding module then starts receiving generated video frames from the video rendering module at a step 740, and encodes them in parallel with the audio stream into a video stream, such as an HLS or RTMP stream, typically consisting of fixed size MPEG-TS segments, at a step 740. Once a predefined portion of the video stream is generated, based on a predefined number of segments (such as HLS segments), as determined at a step 760, the encoding module generates, at a step 770, a streaming manifest file, that is, a file pointing to the full list of segments that represent the current portion of the video stream.

Figure 8:
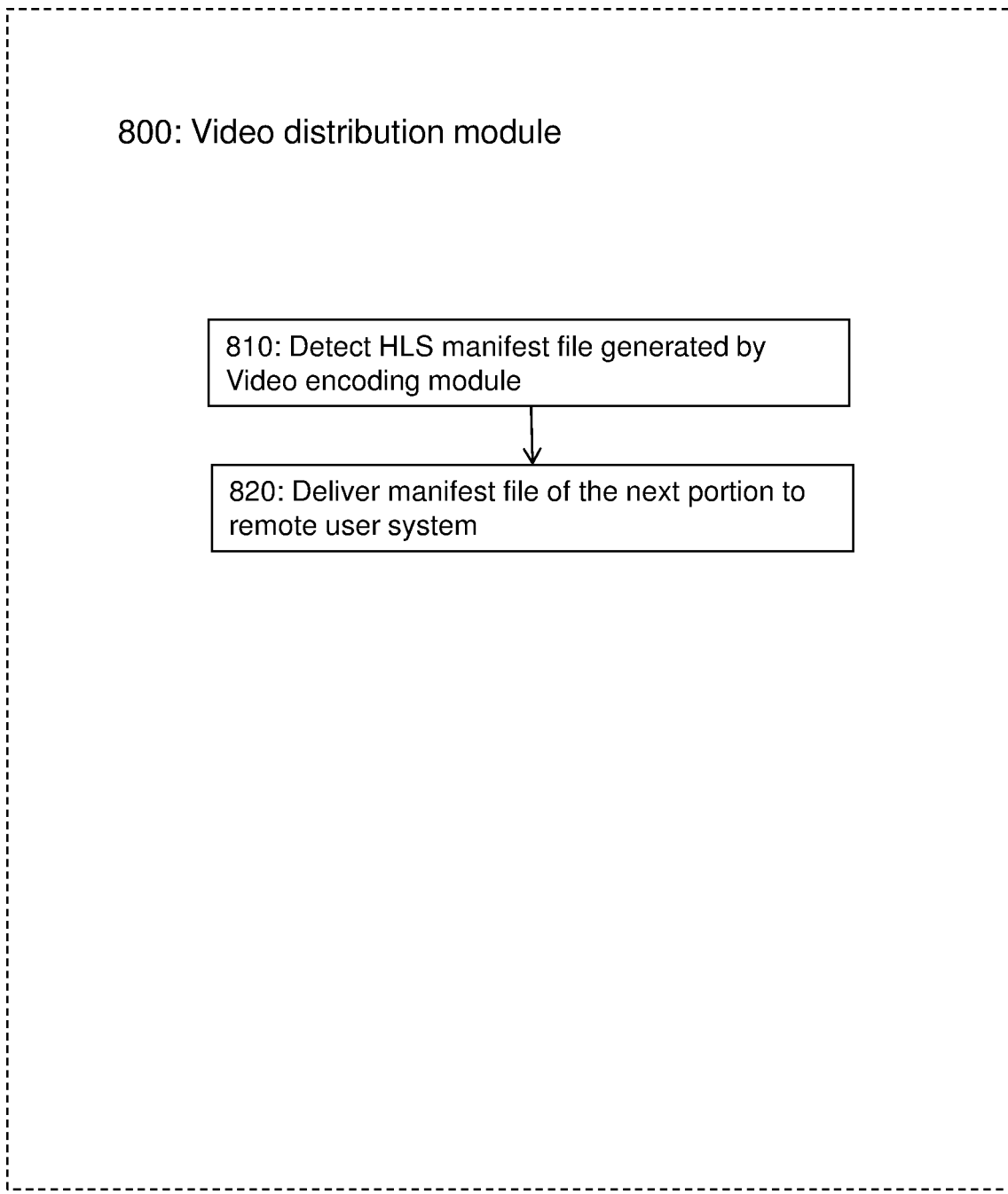
FIG. 8 is a flowchart diagram of a video distribution module of the real-time video generation process, according to some embodiments of the invention.

FIG. 8 is a flowchart diagram of the video distribution module 800 of the real-time video generation process, according to some embodiments of the invention.

When the generation of the streaming manifest file is detected by the distribution module, at a step 810, the module generates a corresponding link, typically an HTTP link to the file and then transmits the link at a step 820 to the requesting user (e.g. the link is transmitting to the server through which the remote user made the initial video request). Alternatively, the module may convey the link to the on-the-fly request module, which may be configured to transmit the link to the user.

Although various features of the invention may be described in the context of a single embodiment, the features may also be provided separately or in any suitable combination. Conversely, although the invention may be described herein in the context of separate embodiments for clarity, the invention may also be implemented in a single embodiment.

It should be understood that the system and modules described above can be implemented in digital electronic circuitry, or in computer hardware, firmware, software, or in combinations thereof. Such elements can be implemented as a computer program product, tangibly embodied in an information carrier, such as a machine-readable storage device or in a propagated signal, for execution by data processing apparatus, such as a programmable processor, computer, or multiple computers at the site of the system or at remote sites. Memory storage may also include multiple distributed memory units, including one or more types of storage media. The system may include network interface modules that may control the sending and receiving of data packets over networks.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A method for generating and streaming video in real-time comprising the steps of:
   receiving from a user at a remote site a request for a personal video, including a template identifier;
   receiving context data of the user including a user profile and user transaction data;
   generating visual and audio materials from the context data, according to predefined rules of a video generation template determined by the template identifier, wherein generating the visual materials comprises generating visual material which represents user transaction data according to the predefined rules, and rendering a first portion of video frames from the context data;
   encoding the first portion of video frames according to a predefined duration and a predefined frame rate per second;
   creating a streaming manifest file for the first portion and conveying a link to the streaming manifest file to the user; and
   streaming the first portion to the user, while generating a subsequent portion of video frames including:
      generating visual materials from the context data, according to predefined rules of a video generation template determined by the template identifier, wherein generating the visual materials comprises generating visual material which represents user transaction data according to the predefined rules, and rendering the subsequent portion of video frames from the context data; and
      encoding the subsequent portion of video frames according to the predefined duration and the predefined frame rate per second;
      such that the first portion of the video frames is streamed while the visual materials for the subsequent portion of the video frames are still being generated.

2. The method of claim 1 wherein the rules determine an order of scenes of the visual and audio material.

3. The method of claim 1 wherein creating the streaming manifest file comprises including in the streaming manifest file a link to the audio materials and streaming the first portion of video frames comprises streaming a first portion of the audio materials together with the first portion of video frames.

4. The method of claim 1 further comprising the step of determining a schedule for preparing each material according to the schedule timing of each material appearance based on scene order and the estimated preparation.

5. The method of claim 1 wherein the generating visual material based on user transaction data results in the visual material including images which provide information representing transactions between the customer and the related business.

6. A system for real-time generation and streaming of video, said system comprising a processor and a memory with instructions that when executed by the processor performing the steps of:
receiving from a user at a remote site a request for a personal video, including a template identifier;
receiving context data of the user including a user profile and user transaction data;
generating visual and audio materials from the context data, according to predefined rules of a video generation template determined by the template identifier, wherein generating the visual materials comprises generating visual material which represents user transaction data according to the predefined rules, and rendering a first portion of video frames from the context data;
encoding the first portion of video frames according to a predefined duration and a predefined frame rate per second;
creating a streaming manifest file for the first portion and conveying a link to the streaming manifest file to the user; and
streaming the first portion to the user, while generating a subsequent portion of video frames including:
generating visual materials from the context data, according to redefined rules of a video generation template determined by the template identifier, wherein generating the visual materials comprises generating visual material which represents user transaction data according to the predefined rules, and rendering the subsequent portion of video frames from the context data; and
encoding the subsequent portion of video frames according to the predefined duration and the predefined frame rate per second;
such that the first portion of the video frames is streamed while the visual materials for the subsequent portion of the video frames are still being generated.

7. The system of claim 6 wherein the rules determine an order of scenes of the visual and audio material.

8. The system of claim 6 wherein creating the streaming manifest file comprises including in the streaming manifest file a link to the audio materials and streaming the first portion of video frames comprises streaming a first portion of the audio materials together with the first portion of video frames.

* * * * *